(12) United States Patent
Meinert et al.

(10) Patent No.: US 11,954,998 B2
(45) Date of Patent: Apr. 9, 2024

(54) POSITION DETECTOR, PASSENGER SERVICE CHANNEL AND VEHICLE AREA FOR DETERMINING THE LOCATION OF A PASSENGER SERVICE UNIT

(71) Applicant: Airbus Operations GmbH, Hamburg (DE)

(72) Inventors: Maximilian Meinert, Hamburg (DE); Martin Hentschel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 147 days.

(21) Appl. No.: 17/551,936

(22) Filed: Dec. 15, 2021

(65) Prior Publication Data
US 2022/0198889 A1 Jun. 23, 2022

(30) Foreign Application Priority Data
Dec. 17, 2020 (DE) .......................... 102020133905.4

(51) Int. Cl.
*B60N 2/005* (2006.01)
*B64D 11/06* (2006.01)
*G08B 5/36* (2006.01)

(52) U.S. Cl.
CPC ................ *G08B 5/36* (2013.01); *B60N 2/005* (2013.01); *B64D 11/0696* (2013.01)

(58) Field of Classification Search
CPC ............ B60N 2/005; B60N 2002/0272; B64D 11/0696; B64D 2013/003; B64D 2231/025; B64D 11/00; B64D 2011/0046; B64D 11/06; H01R 25/14
See application file for complete search history.

(56) References Cited

U.S. PATENT DOCUMENTS

| | | | |
|---|---|---|---|
| 8,643,211 B2 | 2/2014 | Meckes et al. | |
| 8,907,662 B2 * | 12/2014 | Bauer | B64D 11/0624 324/207.17 |
| 10,579,521 B2 | 3/2020 | Trunk et al. | |
| 10,940,819 B2 * | 3/2021 | Zaugg | B60N 2/06 |
| 2008/0078870 A1 | 4/2008 | Kneller et al. | |

(Continued)

FOREIGN PATENT DOCUMENTS

| | | |
|---|---|---|
| DE | 102006061455 A1 | 6/2008 |
| DE | 102009018111 A1 | 10/2010 |
| DE | 102017009880 A1 | 4/2019 |

OTHER PUBLICATIONS

German Search Report; priority document.
European Search Report from corresponding European Patent Application No. 21213008 dated Apr. 8, 2022.

*Primary Examiner* — John A Tweel, Jr.
(74) *Attorney, Agent, or Firm* — Greer, Burns & Crain, Ltd.

(57) ABSTRACT

A position detector for a passenger service unit which can be installed in a passenger service channel. The position detector includes a sensor rail which has a multiplicity of sensors and is configured to be fitted in the longitudinal direction of the passenger service channel. The position detector also includes a position marker which is configured to be fastened to the passenger service unit and to trigger a sensor signal at one of the multiplicity of sensors. A passenger service channel having a position detector and a vehicle area having a passenger service channel are also described.

14 Claims, 3 Drawing Sheets

(56) References Cited

U.S. PATENT DOCUMENTS

| | | | |
|---|---|---|---|
| 2010/0096919 A1* | 4/2010 | Meckes | B60Q 3/53 307/9.1 |
| 2011/0024560 A1 | 2/2011 | Horst et al. | |
| 2011/0101970 A1* | 5/2011 | Lanter | B60R 21/01554 324/207.25 |
| 2012/0032027 A1 | 2/2012 | Gehm et al. | |
| 2014/0152088 A1 | 6/2014 | Bauer et al. | |
| 2015/0122963 A1 | 5/2015 | Mochizuki et al. | |
| 2017/0261343 A1* | 9/2017 | Lanter | B60N 2/0722 |

* cited by examiner

POSITION DETECTOR, PASSENGER SERVICE CHANNEL AND VEHICLE AREA FOR DETERMINING THE LOCATION OF A PASSENGER SERVICE UNIT

CROSS-REFERENCES TO RELATED APPLICATIONS

This application claims the benefit of the German patent application No. 102020133905.4 filed on Dec. 17, 2020, the entire disclosures of which are incorporated herein by way of reference.

FIELD OF THE INVENTION

The present invention relates to a position detector for detecting a location of a passenger service unit in the longitudinal direction of a passenger service channel, and to a passenger service channel and a vehicle area having a corresponding position detector and passenger service channel, respectively. In particular, the present invention relates to a position detector, to a passenger service channel and to a vehicle area having a sensor rail having a multiplicity of sensors and a position marker which is fastened to a passenger service unit and is detected by one of the sensors.

BACKGROUND OF THE INVENTION

In means of transport, in particular in aircraft, buses or trains, rows of seats containing passenger seats are arranged substantially at right angles to a longitudinal direction of the means of transport. Depending on the comfort offered, for example in the form of one or more booking classes, the distance between two rows of seats may vary, when viewed in the longitudinal direction of the means of transport. Many vehicle operators require a flexible configuration of the interior of the vehicle, in particular the possibility of being able to quickly and flexibly change the number of passenger seats in the vehicle. For this purpose, entire rows of seats, in particular, may be detached from a fastening, in particular shifted in the longitudinal direction of the vehicle and fastened again, in order to provide space for additional rows of seats or vice versa in order to enable a greater distance between seats.

Passenger service units which provide, for example, reading lights and fresh air nozzles for each individual passenger are usually arranged above passenger seats. For each change in the arrangement of the passenger seats, these passenger service units must likewise be changed in terms of their location and number. Additional work steps are needed if the passenger service units must be matched to the associated passenger seats.

SUMMARY OF THE INVENTION

The invention is therefore based on the object of making it possible to divide a vehicle for different numbers of passengers and to effect this quickly.

According to a first aspect for the better understanding of the present disclosure, a position detector for a passenger service unit which can be installed in a passenger service channel comprises a sensor rail which has a multiplicity of sensors. The sensor rail can be fitted in the longitudinal direction of the passenger service channel. The position detector also comprises a position marker which is configured to be fastened to the passenger service unit and to trigger a sensor signal at one of the multiplicity of sensors.

As a result, the multiplicity of sensors can be used to determine and/or read the position of the passenger service unit along the passenger service channel (viewed in its longitudinal direction). It goes without saying that a multiplicity of passenger service units having a respective position marker can also each trigger a sensor signal and can therefore be detected in the passenger service channel and their respective position can be determined and/or read.

For example, the multiplicity of sensors may be arranged in a line, preferably along a longitudinal direction of the sensor rail. In order to limit the number of sensors, there may be a predefined distance between two adjacent sensors. For example, the predefined distance between two adjacent sensors may be the same for all of the multiplicity of sensors. This makes it possible to determine an exact position of a position marker and therefore of a passenger service unit in the longitudinal direction of the sensor rail on the basis of sequential numbering of the sensors. Merely by way of example, the distance between two adjacent sensors may be 1 cm, 2 cm, 5 cm or 10 cm or 1 inch, 2 inches or 5 inches.

Alternatively, there may also be any desired distances between sensors, in which case, in order to determine the location of a position marker and therefore of a passenger service unit, it is necessary here to know the location of each individual sensor with respect to a reference point.

Each sensor is configured to output a corresponding sensor signal if a position marker activates the sensor, for example interacts with the sensor. It is therefore possible to very quickly detect where a passenger service unit is installed along the passenger service channel. In particular, it is possible to very quickly detect whether an associated passenger service unit is installed at the correct point for each row of seats (or for each individual passenger seat).

For example, in addition to reading lights and fresh air nozzles, oxygen masks must also be provided in aircraft. These oxygen masks are usually also installed in the passenger service channel. In order to be able to comply with legal and/or official regulations, (grid) plans depicting the location of passenger seats and the location of associated oxygen masks in an aircraft were previously created for the aircraft and officially certified. This had to be carried out again each time the arrangement of the passenger seats in the aircraft was changed. The location of the oxygen masks in a passenger service channel can be quickly and easily determined with the aid of the position detector described here. It is also possible to retrieve and check at once a predefined location of all oxygen masks in the passenger service channel.

In one implementation variant, at least one of the multiplicity of sensors may be a pressure sensor. In this case, the position marker may comprise a protruding element and a spring element, wherein the spring element is configured to press the protruding element in the direction of the multiplicity of sensors. The protruding element may be a pin, a ball or the like which is operatively connected to the spring element. For example, the protruding element may be fastened or coupled to one side of the spring element, wherein the spring element exerts a force on the protruding element, which force acts in the direction of the sensor rail if the passenger service unit having the position marker is installed in the passenger service channel.

If the passenger service unit having the position marker is moved in the longitudinal direction of the passenger service channel, the protruding element of the position marker can press on one of the multiplicity of sensors as soon as the location of the position marker (viewed in the longitudinal direction of the passenger service channel) corresponds to that of the sensor. For example, if the passenger service unit is moved, one sensor can always output a corresponding signal in succession if the position marker is at the level of the respective sensor and activates the sensor. The location along the passenger service channel can therefore be checked while installing the passenger service unit.

If the position marker has a pin or a ball, the pin or the ball can slide or roll along the sensor rail and can touch the respective sensor in succession and can activate it in the process.

In a further implementation variant, the sensor rail may have a groove running in the longitudinal direction of the sensor rail. The position marker can slide or roll in this groove, while the passenger service unit in the passenger service channel is moved along the longitudinal direction of the latter. The multiplicity of sensors may be arranged in the groove.

Optionally, the groove running in the longitudinal direction of the sensor rail may also comprise a multiplicity of depressions, wherein each of the multiplicity of sensors is arranged in an associated depression. This is advantageous, in particular, in the case of a position marker having a spring element since the position marker latches at least a little in the respective depression and therefore provides haptic feedback. Furthermore, it is possible to activate the sensor in the depression when there is an exact correspondence of location between the position marker and the sensor.

In another implementation variant, at least one of the multiplicity of sensors may be an electrically conductive element. In this case, the position marker may be connected to an electrical voltage source or to an electrical ground line (grounding) and may be configured to make contact with one of the multiplicity of sensors. In other words, the position marker may be in the form of a touch element. For example, the position marker may also comprise a protruding element and a spring element, as is the case in the implementation variant described above. The touch element may be electrically conductive and may interact with the electrically conductive sensor. As soon as the two elements touch, electrical current can flow and the location of the position marker can therefore be determined. This makes it possible to query the multiplicity of sensors at any desired time, while the position detector (for example the position marker or the sensor) is deenergized the rest of the time.

In yet another implementation variant, at least one of the multiplicity of sensors may be a magnetic sensor, and the position marker may comprise a magnet. It is therefore also possible to detect the position of the position marker along the sensor rail without contact.

In a further implementation variant, at least one of the multiplicity of sensors may be a membrane potentiometer. In this case, the membrane potentiometer may be configured to have a resistance value which is dependent on a position of touching (pressure) of the membrane potentiometer. Therefore, the membrane potentiometer can function together with a touch position marker, as provided in the implementation variants described above.

Alternatively or additionally, the membrane potentiometer may be configured to have a resistance value which is dependent on a position of a magnetic field. In particular, the resistance value of the membrane potentiometer may change if a magnet is situated in the immediate vicinity of the membrane potentiometer. In this case, "immediate vicinity" relates to a distance between a magnet and the membrane potentiometer of approximately 1 mm to 5 cm, preferably approximately 5 mm to 3 cm. It goes without saying that the magnet can also rest on the membrane potentiometer, that is to say, can touch the latter.

Since a membrane potentiometer permits only a small number of measurement points, a multiplicity of membrane potentiometers may be arranged along the sensor rail, wherein each of the multiplicity of membrane potentiometers can output one or more corresponding sensor signals in the form of a particular resistance value. The positions of a multiplicity of position markers can therefore be determined from knowledge of the location of each individual membrane potentiometer along the sensor rail (with respect to a fixed reference point).

In yet another implementation variant, the sensor rail may comprise a multiplicity of indication elements. For example, each of the multiplicity of indication elements may be arranged on or beside an associated one of the multiplicity of sensors. In the case of non-punctiform sensors, for example a membrane potentiometer, the multiplicity of indication elements may be arranged at a predefined distance (pattern) along the sensor rail.

Each of the multiplicity of indication elements may perform different functions. For example, one indication element may output or represent a particular color which changes depending on the position of a position marker. An indication element may therefore be a light or an LED (light-emitting diode) which is assigned, for example, to a particular sensor of the multiplicity of sensors. If this sensor outputs a sensor signal, that is to say, if it is activated by an appropriately positioned position marker, the associated indication element can indicate this using color. For example, when the sensor is activated, the associated indication element can emit green light, whereas it emits red light when the sensor is not activated. As a result, the correct position can be indicated and/or checked during installation or at any subsequent time, for example by passenger service units with a position marker.

An optional power supply for the indication element can be effected via the sensor or the indication element can be electrically coupled to the sensor, with the result that the indication element is also activated when a current flows from the position marker through the sensor.

Alternatively, it is also possible to activate the indication elements which correspond to a respective sensor at which a position marker (and therefore a passenger service unit) must be arranged. The location of passenger service units can therefore be indicated before they are installed, thus facilitating installation.

Alternatively or additionally, at least one of the multiplicity of indication elements may be a mechanically, magnetically and/or thermally actuated indication element. For example, the indication element may be coupled to the associated sensor, with the result that the indication element is moved when the sensor is touched (in the case of a pressure on the sensor), wherein the movement is visible. For example, the indication element can be moved to a window in the sensor rail. The indication element may likewise undergo a visible change in response to a magnetic field or a temperature change (in particular heating, for example as a result of current flow in the sensor). In particular, the indication element can change its color on the basis of the magnetic field or on the basis of its temperature.

In another implementation variant, the position detector may also comprise a controller which is connected to the multiplicity of sensors and is configured to detect and evaluate at which of the multiplicity of sensors a position marker is arranged. The controller may be configured, in particular, to receive and evaluate a sensor signal from each of the multiplicity of sensors. In particular, the controller can transmit an electrical signal to the multiplicity of sensors and can receive a corresponding electrical signal depending on activation or deactivation of the respective sensor.

Furthermore, the controller may also be configured to evaluate one or more sensors as a group, wherein the controller stores a position of the group with respect to a reference point. For example, a position of a group of pressure sensors or magnetic sensors or of one or more membrane potentiometers with respect to a reference point (origin or zero point) may be stored in the controller. This makes it possible to determine the exact location of an activated sensor or a touch point or a magnetically activated point on the sensor rail.

According to a second aspect for the better understanding of the present disclosure, a passenger service channel may comprise an installation rail which is arranged along a longitudinal direction of the passenger service channel, and at least one passenger service unit which is configured to be fastened to the installation rail. For example, the passenger service channel may be arranged in the longitudinal direction of a vehicle, whereas one or more passenger service units in the passenger service channel are fastened to the installation rail.

The passenger service channel may also comprise a position detector according to the first aspect, wherein the at least one passenger service unit comprises the position marker of the position detector. In particular, each passenger service unit may comprise at least one position marker. As a result, the location of each individual passenger service unit in the passenger service channel can be determined and checked with the aid of the position detector.

In one implementation variant, the position marker of the position detector may be fitted to a housing or a holder of the passenger service unit or integrated therein. The passenger service unit may therefore be adapted to the position detector and may interact with its sensor rail.

In a further implementation variant, the sensor rail of the position detector may be fastened to the installation rail or may be integrated in the latter and may extend along a longitudinal direction of the installation rail. In particular, the multiplicity of sensors may be fitted or integrated in the installation rail, with the result that the installation rail and the sensor rail are the same component.

According to a third aspect for the better understanding of the present disclosure, a vehicle area may comprise a passenger service channel according to the second aspect. The vehicle area may be a section of the vehicle which comprises at least one passenger seat, in particular at least one row of seats. The vehicle area may also have the passenger service channel above the passenger seat (above the row of seats), with the result that at least one passenger service unit can be installed above the at least one passenger seat and its position can be detected and checked with the aid of the position detector from the first aspect.

In one implementation variant, the vehicle area may also comprise a seat rail which is arranged in the longitudinal direction of the vehicle area and has a multiplicity of seat detectors, wherein each of the multiplicity of seat detectors is configured to detect whether a passenger seat is installed in the seat rail at or beside the sensor. The multiplicity of seat detectors may have the same design as or a similar design to the position detector according to the first aspect. In this case, a position marker which can mark the location of the passenger seat along the seat rail may be provided at the passenger seat.

The vehicle area may also comprise a controller which is connected to the multiplicity of seat detectors and is configured to evaluate whether, for a passenger seat installed in the seat rail, an associated position marker in the longitudinal direction of the vehicle area is detected in the passenger service channel. In other words, the controller can check or at least evaluate whether, for a passenger seat detected by a seat detector, a passenger service unit with an associated position marker is arranged and installed above the passenger seat in the longitudinal direction of the vehicle area.

This makes it possible to equip a vehicle area with passenger seats and passenger service units without plans of the layout of the seats and service units having to be created and certified beforehand During installation and/or after installation of the passenger seats and passenger service units, their respective location and their relative location with respect to one another can be retrieved and checked with the aid of the controller. Only by way of example, the controller may store a plurality of layouts of seats and service units which can each be retrieved for checking. It is therefore possible to check whether there are position markers in the passenger service channel and corresponding seat detectors in the seat rail at the associated positions by means of an appropriate setting on the controller (for example, selection of a stored layout).

It goes without saying that the aspects and implementation variants described above may also be combined without this being explicitly described. Each of the described implementation variants can therefore be considered to be optional for each of the aspects and their implementation variants or even combinations thereof. The present disclosure is therefore not restricted to the individual configurations and implementation variants in the described sequence or a particular combination of the aspects and implementation variants.

BRIEF DESCRIPTION OF THE DRAWINGS

Preferred exemplary embodiments of the invention are now explained in more detail on the basis of the accompanying schematic drawings, in which.

DETAILED DESCRIPTION OF THE PREFERRED EMBODIMENTS

Figure 1:
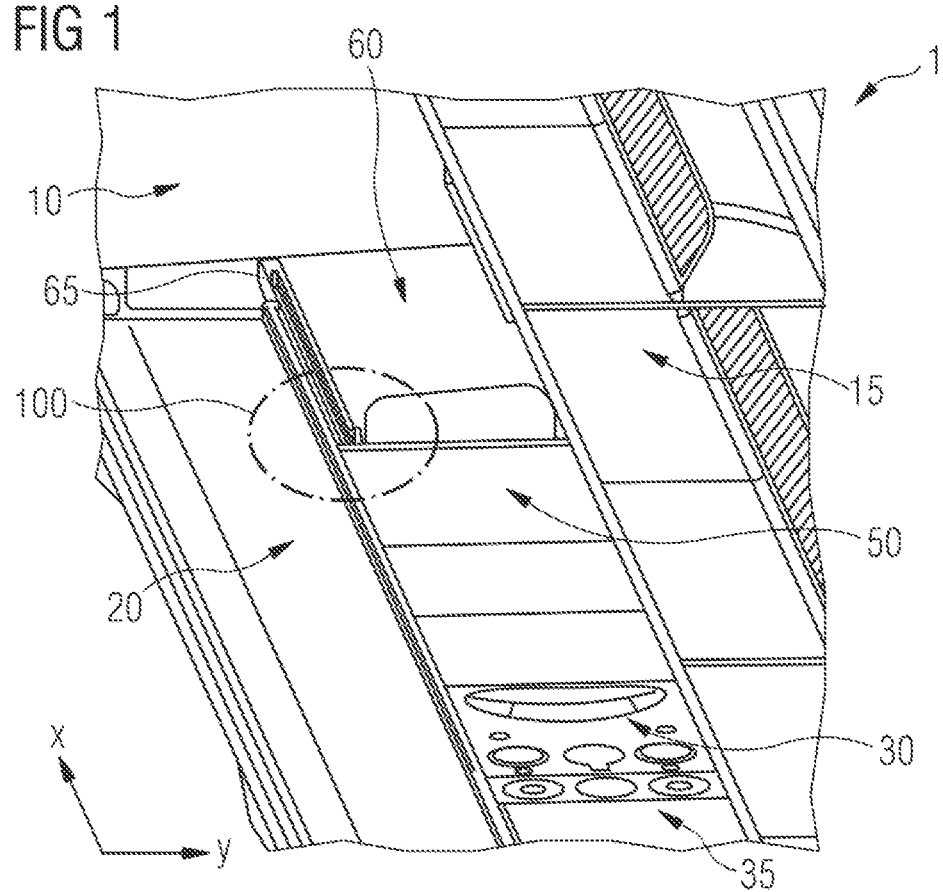
FIG. 1 schematically shows a view of a vehicle area with a partially equipped passenger service channel.

FIG. 1 schematically shows a view of a vehicle area 1 with a partially equipped passenger service channel 60. For example, the vehicle area 1 may comprise an overhead luggage compartment 10, on the underside of which, shown in FIG. 1, a passenger service channel 60 is arranged, in particular in the longitudinal direction of the vehicle (X axis). The passenger service channel 60 has at least one installation rail 65 which is arranged along a longitudinal direction of the passenger service channel 60 (likewise X axis).

Various passenger service units may be installed in the passenger service channel 60. A reading light and information panel 30 or an air shower panel 35, which contain an individual reading light and/or an individual fresh air nozzle for at least one passenger, may thus be installed in the passenger service channel 60. A holder 50 for oxygen masks may also be installed in the passenger service channel 60.

Areas in which no passenger service unit 30, 35, 50 is installed can be closed by means of simple covers. Areas (in the Y axis direction) beside the passenger service channel 60 may likewise be closed by means of corresponding covers, for example a cover 15 with a handrail and a cover 20 with an air outlet grille.

Figure 2:
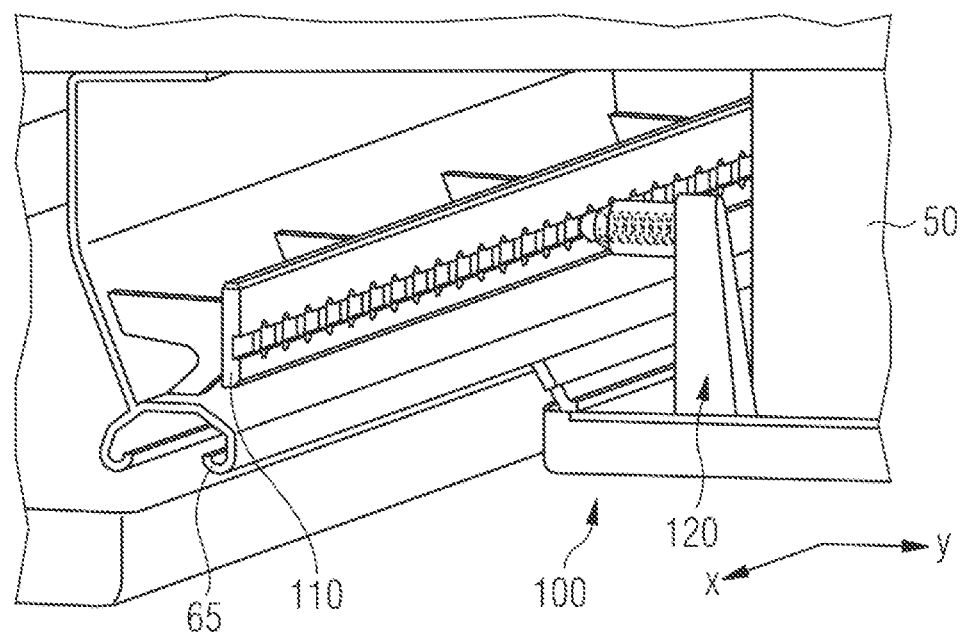
FIG. 2 schematically shows a detail of a passenger service channel from FIG. 1.

FIG. 2 schematically shows a detail of the passenger service channel 60 which is highlighted using dash-dotted lines in FIG. 1. The service channel 60 comprises at least one installation rail 65 which is configured to install a passenger service unit 30, 35, 50 therein. In the variant illustrated in FIG. 2, the passenger service unit 30, 35, 50 (here an oxygen mask unit 50, for example) may be suspended from and fastened to a lower end of the installation rail 65. This may be a conventional fastening of service units 30, 35, 50, which is therefore not described in any more detail.

A sensor rail 110 can be installed on the installation rail 65 (or integrated therein). The service unit 30, 35, 50 may also comprise a position marker 120 associated with the sensor rail 110. For example, the position marker 120 may be fitted to the service unit 30, 35, 50 (or integrated therein). The position marker 120 is configured to trigger a sensor signal at one of a multiplicity of sensors 111 of the sensor rail 110.

The method of operation of the position detector 100 is explained with reference to FIGS. 3 and 4 which schematically show a position marker 120 and a position detector 100, respectively. The position detector 100 comprises a sensor rail 110 having a multiplicity of sensors 111. The sensor rail 110 is also configured to be fitted, for example, in the longitudinal direction of the passenger service channel 60 or to be integrated in the latter. The associated position marker 120 which is configured to be fastened to the passenger service unit 30, 35, 50 or to be integrated in the latter may trigger a sensor signal at one of the multiplicity of sensors 111.

Figure 3:
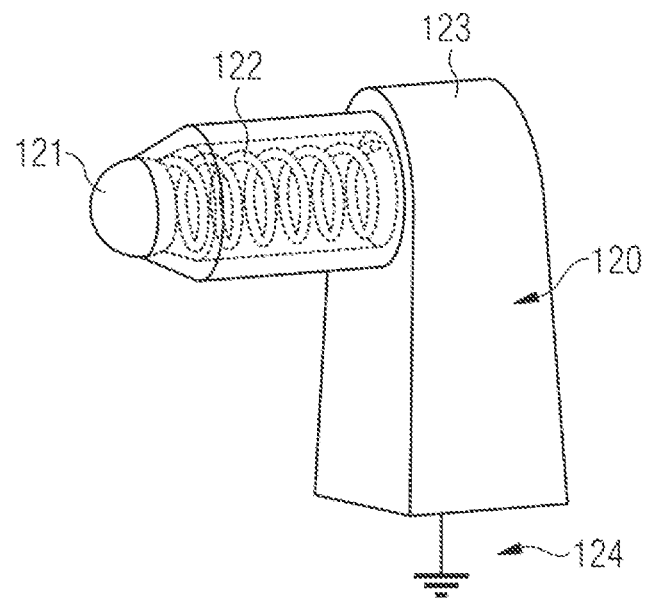
FIG. 3 schematically shows a position marker.
Figure 4:
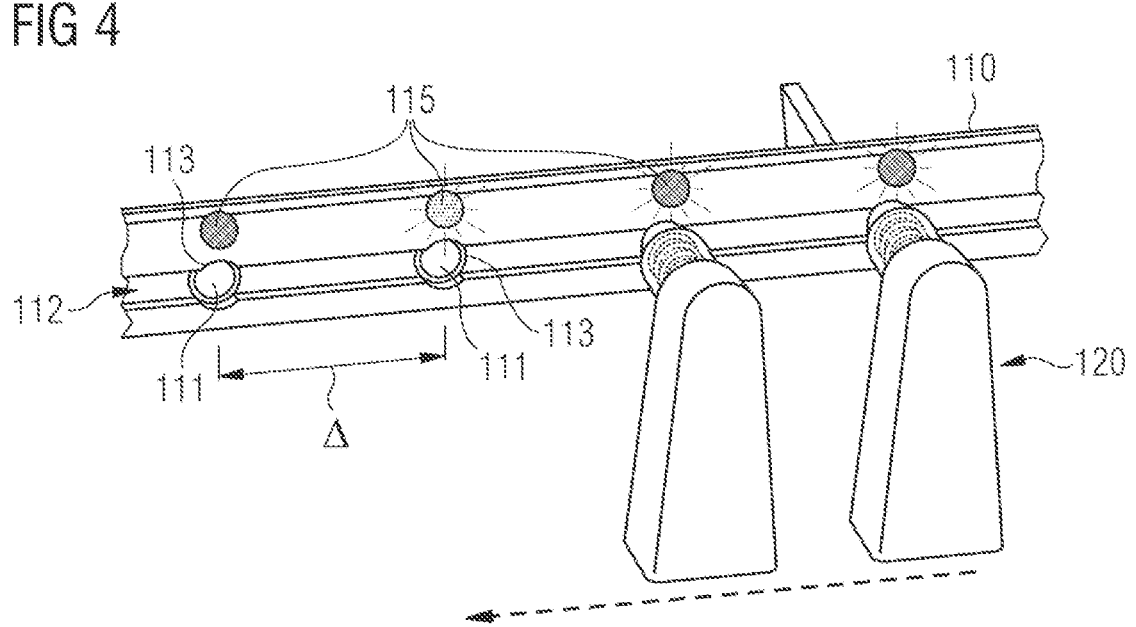
FIG. 4 schematically shows a position detector.

According to the variant of a position detector 100 illustrated in FIGS. 3 and 4, the sensor rail 110 comprises an optional groove 112 running in the longitudinal direction of the sensor rail 110. A multiplicity of likewise optional depressions 113 are situated in the groove 112. The position marker 120 may comprise a protruding element 121 and a spring element 122, wherein the latter is configured to press the protruding element 121 in the direction of the sensor rail 110. The position marker 120 also comprises a stationary element 123 which is fastened to the passenger service unit 30, 35, 50 or is formed by a section of the passenger service unit 30, 35, 50. The spring element 122 now presses the protruding element 121 away from the stationary element 123. The protruding element 121 may be a pin or a ball or the like, wherein touching between the protruding element 121 and the sensor rail 110 which is as punctiform as possible is effected.

FIG. 4 schematically illustrates a movement of the position marker 120 in the longitudinal direction of the sensor rail 110, wherein the position marker 120 is moved in the direction illustrated by the dashed arrow (to the left in FIG. 4), which is why the position marker 120 is illustrated twice. The protruding element 121 may slide or roll along the sensor rail 110, here in the groove 112, for example. The protruding element 121 may latch in each of the optional depressions 113. The latching is effected by a movement of the protruding element 121 in a direction substantially at right angles to the sensor rail 110 (for example in the direction of the Y axis) owing to the spring element 122. Appropriately selecting a shallow depth of the depressions 113 makes it possible for the protruding element 121 to leave the depression 113 again during a further movement of the position marker 120 along the sensor rail 110. In this case, the protruding element 121 is moved in the direction of the stationary element 123 again counter to the spring force of the spring element 122. This (interim) latching enables haptic feedback during the movement of the position marker 120 or the associated passenger service unit 30, 35, 50 which has the position marker 120.

The sensor rail 110 has a multiplicity of sensors 111. For example, one sensor 111 may be arranged in one depression 113 in each case. It goes without saying that the multiplicity of sensors may also be fitted to or integrated in the sensor rail 110 if there is no depression 113 and/or no groove 112 in the sensor rail 110.

The sensors 111 may be, for example, pressure sensors which are activated by touch or pressure from the position marker 120, in particular its protruding element 121. An exemplary pressure sensor is a piezo element which outputs a current signal as a result of the touch caused by the position marker 120. A further exemplary pressure sensor may change an electrical signal, for example its resistance value, on the basis of a pressure force acting on it.

Alternatively or additionally, a sensor 111 and a position marker 120 may each be an electrically conductive element. For example, a voltage may be applied to the sensor 111, while the position marker 120 is connected to a ground line (illustrated as grounding 124 in FIG. 3). If the position marker 120, in particular its protruding element 121, now touches the sensor 111, an electrical circuit is closed, as a result of which the electrical current flow corresponds to a sensor signal. In this case, the voltage may be selected to be so low that it is harmless for personnel installing the passenger service unit 30, 35, 50.

Likewise alternatively or additionally, the associated passenger service unit 30, 35, 50 can be supplied with power via the sensor 111 and the position marker 120. In other words, the sensor 111 and the position marker 120 form a power supply for the passenger service unit 30, 35, 50. The passenger service unit 30, 35, 50 can therefore not only be reliably supplied with power, but also the (correct) location of the passenger service unit 30, 35, 50 can also be checked at the same time.

It goes without saying that the position marker 120 can also conversely carry a voltage, while the sensor is connected to a ground line. For example, the voltage source may be a small battery or a piezo element on the position marker 120 or on the passenger service unit 30, 35, 50.

There is a predefined distance A between two adjacent sensors 111, wherein the same distance A is always provided between two adjacent sensors 111 of the multiplicity of sensors 111 if possible. This predefined pattern makes it possible to easily determine the location of a position marker 120 along the sensor rail 110 and therefore along the passenger service channel 60.

The sensor rail 110 may likewise optionally comprise a multiplicity of indication elements 115. For example, one of the multiplicity of indication elements 115 may be respectively arranged at or beside an associated one of the multiplicity of sensors 111. An indication element 115 may be configured in this case to output a signal (visually and/or acoustically) if a position marker 120 triggers a sensor signal at the associated sensor 111, that is to say, activates the associated sensor 111. The indication element can therefore indicate whether a position marker 120, and therefore a passenger service unit 30, 35, 50, is arranged and installed at the correct point in the passenger service channel 60.

Alternatively or additionally, as illustrated in FIG. 4, the multiplicity of indication elements 115 can be controlled in such a manner that they indicate a desired location of the position marker 120 and therefore of a passenger service unit 30, 35, 50 along the sensor rail 110. For example, an indication element may emit green light (illustrated using dotted lines in FIG. 4), whereas the adjacent indication elements emit red light (illustrated using hatching in FIG. 4). When installing the passenger service unit 30, 35, 50, it must therefore be shifted along the sensor rail 110 (see arrow illustrated using dashed lines in FIG. 4) in such a manner that the location of the associated position marker 120 corresponds to the correct (green) indication element 115 and the associated sensor 111.

Figure 5:
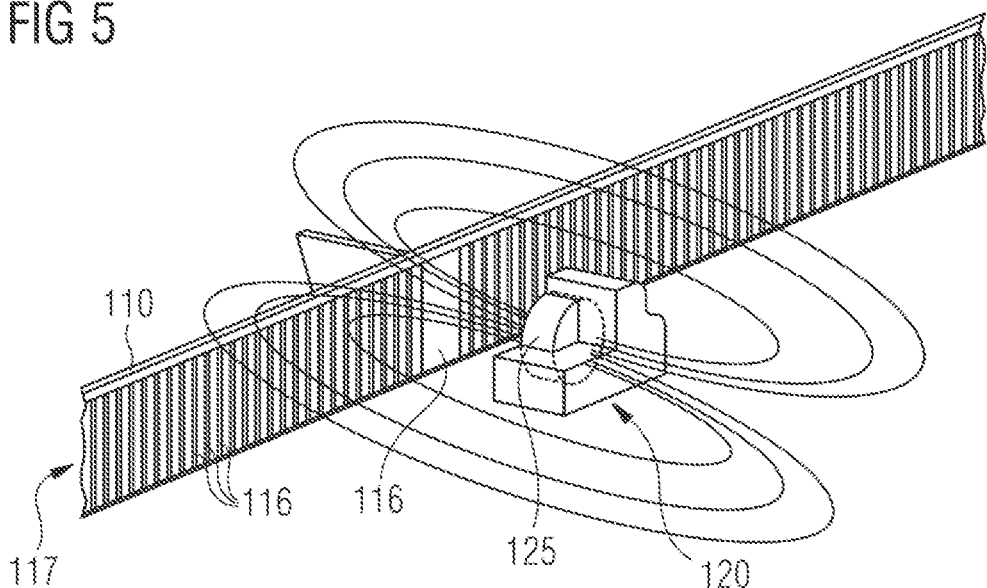
FIG. 5 schematically shows another variant of a position detector.

FIG. 5 schematically shows a further variant of a position detector 100. In this variant, the sensor rail 110 comprises a multiplicity of magnetic sensors 116 which change a sensor value, for example a resistance value for electrical current, on the basis of the strength of a magnetic field. Accordingly, a magnet 125 can be installed on the position marker 120. The magnetic sensor 116 which outputs the largest (or smallest) sensor signal can be determined as the sensor 111/116 which corresponds to the location of the position marker 120 (in the longitudinal direction of the sensor rail 110). This makes it possible to determine and evaluate the location of the position marker 120 and therefore of the passenger service unit 30, 35, 50 along the sensor rail 110 and therefore along the passenger service channel 60 without contact.

Alternatively or additionally, in the variant according to FIG. 5, the sensor rail 110 may comprise a membrane potentiometer 117. This may assume a particular resistance value for electrical current via pressure and/or a magnetic field at a particular position along the membrane potentiometer 117. The position of the position marker 120 can therefore be determined via touch or without contact by means of the membrane potentiometer 117 having a (touch) position marker 120 according to FIG. 3 or having a magnetic position marker 120 according to FIG. 5.

Figure 6:
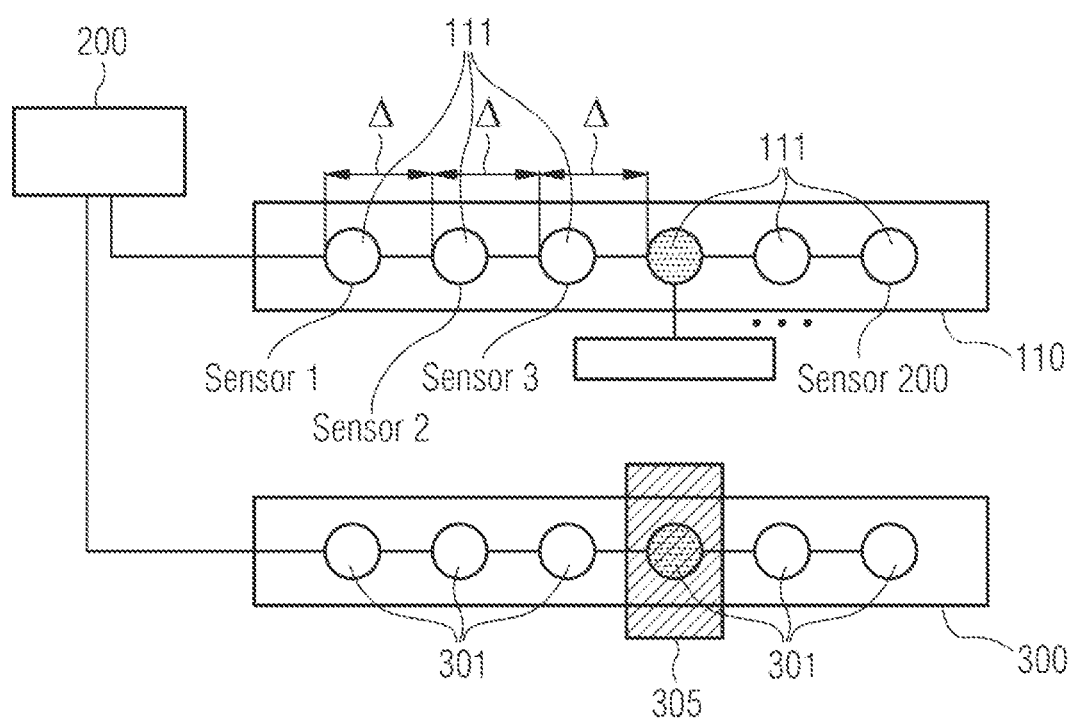
FIG. 6 schematically shows a position detector together with a seat rail and seat detectors of a vehicle area.

FIG. 6 schematically shows a position detector 100 together with a seat rail 300 and seat detectors 301 of a vehicle area 1. The position detector 100 and/or the vehicle area 1 may therefore comprise a controller 200 which can receive and evaluate at least one sensor signal from the sensors 111 of the sensor rail 110. As a result, the controller 200 is able to determine a position of at least one position marker 120 along the sensor rail 110 (for example, in the longitudinal direction of the vehicle area 1; see X axis in FIGS. 1 and 2).

The controller 200 may also be connected to the seat detectors 301 of the seat rail 300. For example, the controller 200 can receive and evaluate sensor signals from the seat detectors 301. The seat detectors 301 are configured to detect whether a passenger seat 305 (illustrated only schematically in FIG. 6 as a footprint of a seat base) has been installed in the seat rail 300 at or beside a seat detector 301. In other words, the location of a passenger seat 305 along the seat rail 300 can be determined with the aid of the seat detectors 301. This seat rail 300 is preferably likewise oriented and installed along the longitudinal direction of the vehicle area 1 (X axis).

The controller 200 can now evaluate whether, for a passenger seat 305 installed in the seat rail 300, an associated position marker 120 in the longitudinal direction of the vehicle area 1 is present in the passenger service channel 60. For this purpose, the controller 200 can compare the sensor signals from the sensors 111 and from the seat detectors 301 since the controller has stored the corresponding location of the sensors along the longitudinal direction of the vehicle area 1.

The controller 200 may also comprise an output device (not illustrated) which can be used, on the one hand, to display the location of all position markers 120 along the sensor rail 110, for example on a display. On the other hand, the location of all passenger seats 305 along the seat rail 300 can be displayed on the display. Furthermore, the controller 200 can use the output device to visually or acoustically present whether or not the location of all passenger service units 30, 35, 50 (via respective position markers 120) corresponds to the location of an associated passenger seat 305.

The exemplary embodiments and variants described above are used only to illustrate the invention. All examples, variants and individual details can be combined with one another in any desired manner in order to form particular embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A position detector for a passenger service unit which can be installed in a passenger service channel, wherein the position detector comprises:
 a sensor rail which has a multiplicity of sensors and is configured to be fitted in a longitudinal direction of the passenger service channel, wherein each of the sensors from the multiplicity of sensors is arranged in an associated depression on the sensor rail; and
 a position marker which is configured to be fastened to the passenger service unit and to trigger a sensor signal at one of the multiplicity of sensors, wherein the position marker is configured to make contact with one of the multiplicity of sensors.

2. The position detector according to claim 1,
wherein at least one of the multiplicity of sensors is a pressure sensor, wherein the position marker comprises a protruding element and a spring element, and
wherein the spring element is configured to press the protruding element in a direction of the multiplicity of sensors.

3. The position detector according to claim 2,
wherein the sensor rail has a groove running in the longitudinal direction of the sensor rail, and the groove running in the longitudinal direction of the sensor rail comprises the multiplicity of depressions.

4. The position detector according to claim 1,
wherein at least one of the multiplicity of sensors is an electrically conductive element, and
wherein the position marker is connected to an electrical voltage source or to an electrical ground line.

5. The position detector according to claim 1,
wherein at least one of the multiplicity of sensors is a magnetic sensor, and
wherein the position marker comprises a magnet.

6. The position detector according to claim 1, wherein at least one of the multiplicity of sensors is a membrane potentiometer.

7. The position detector according to claim 1,
wherein the sensor rail comprises a multiplicity of indication elements, and
wherein each of the multiplicity of indication elements is preferably arranged on or beside an associated one of the multiplicity of sensors.

8. The position detector according to claim 1, also comprising:
a controller which is connected to the multiplicity of sensors and is configured to detect and evaluate at which of the multiplicity of sensors a position marker is arranged.

9. A passenger service channel comprising:
an installation rail which is arranged along a longitudinal direction of the passenger service channel;
at least one passenger service unit which is configured to be fastened to the installation rail; and
a position detector according to claim 1,
wherein the at least one passenger service unit comprises the position marker of the position detector.

10. The passenger service channel according to claim 9, wherein the sensor rail of the position detector is fastened to the installation rail or is integrated in the installation rail and extends along a longitudinal direction of the installation rail.

11. A vehicle area comprising:
a passenger service channel according to claim 9.

12. The vehicle area according to claim 11, also comprising:
a seat rail which is arranged in the longitudinal direction of the vehicle area and has a multiplicity of seat detectors, wherein each of the multiplicity of seat detectors is configured to detect whether a passenger seat is installed in the seat rail at or beside the seat detector; and
a controller which is connected to the multiplicity of seat detectors and is configured to evaluate whether, for a passenger seat installed in the seat rail, an associated position marker in the longitudinal direction of the vehicle area is detected in the passenger service channel.

13. A position detector for a passenger service unit which can be installed in a passenger service channel, wherein the position detector comprises:
a sensor rail which has a multiplicity of sensors and is configured to be fitted in a longitudinal direction of the passenger service channel, wherein at least one of the multiplicity of sensors is a membrane potentiometer; and
a position marker which is configured to be fastened to the passenger service unit and to trigger a sensor signal at one of the multiplicity of sensors.

14. A position detector for a passenger service unit which can be installed in a passenger service channel, wherein the position detector comprises:
a sensor rail which has a multiplicity of sensors and a multiplicity of indication elements and is configured to be fitted in a longitudinal direction of the passenger service channel, wherein at least one of the multiplicity of sensors is a magnetic sensor; and
a position marker which is configured to be fastened to the passenger service unit and to trigger a sensor signal at one of the multiplicity of sensors, wherein the position marker comprises a magnet, wherein the magnetic sensor changes a sensor value on the basis of the strength of a magnetic field, wherein at least one of the multiplicity of indication elements undergoes a visible change in response to the magnetic field.

* * * * *